Sept. 5, 1961     E. P. AGHNIDES     2,998,929
WATER AERATORS
Filed Feb. 18, 1957                                       2 Sheets-Sheet 1
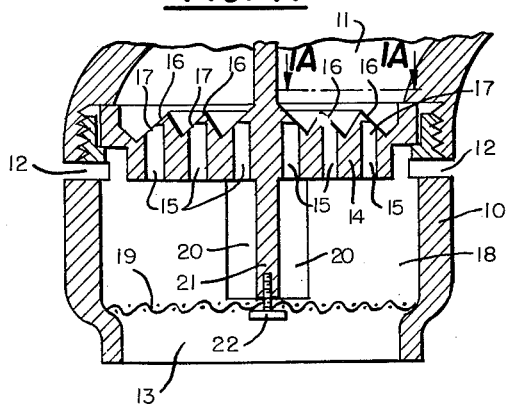
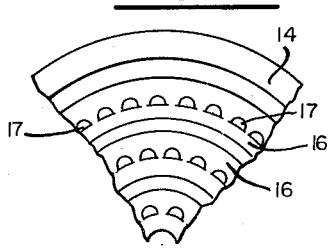
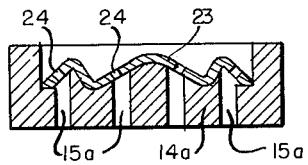
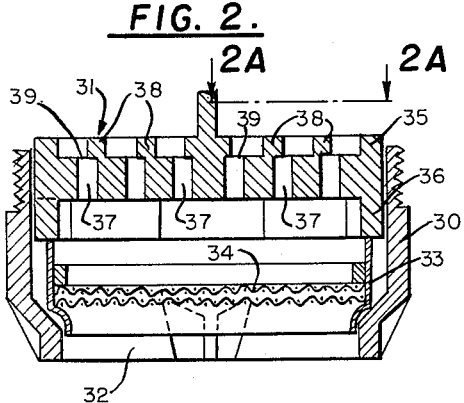
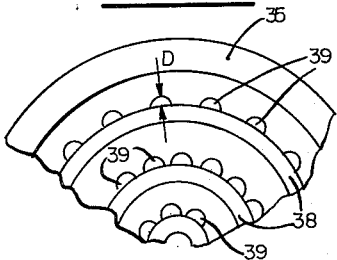
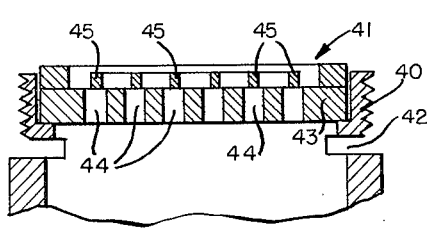
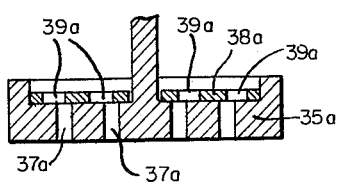
INVENTOR
Elie P. Aghnides
BY *Moore & Hall*
ATTORNEYS

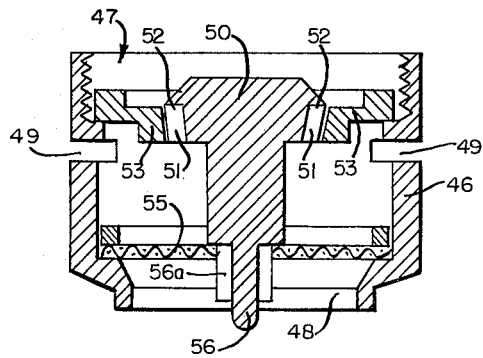
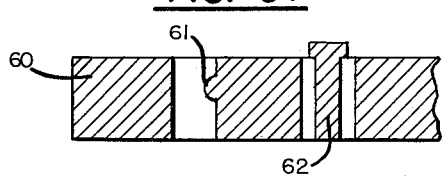
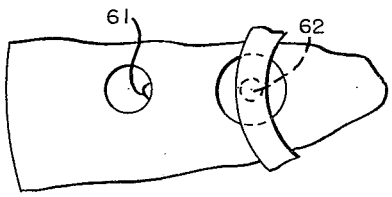
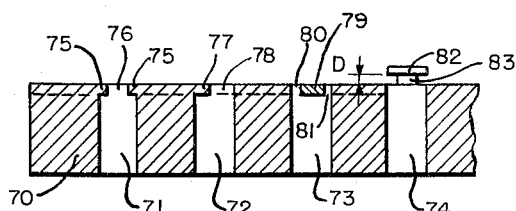
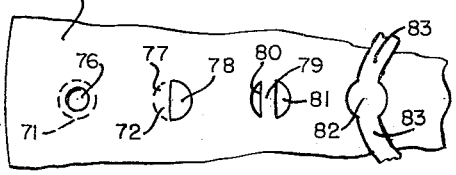
INVENTOR
Elie P. Aghnides
BY Moore & Hall
ATTORNEYS United States Patent Office 2,998,929
Patented Sept. 5, 1961

2,998,929
WATER AERATORS
Elie P. Aghnides, 46 W. 54th St., New York 19, N.Y.
Filed Feb. 18, 1957, Ser. No. 640,859
23 Claims. (Cl. 239—431)

This invention relates to devices for aerating water, and particularly to devices for attachment to or use on domestic public and industrial water systems, and has for its object the provision of an improved device of this character. Aeration devices are now in wide use on the faucets of such water systems to aerate the water and otherwise improve the discharge water.

Extensive investigations and experiments have confirmed my conception of an aerator of simplified construction which gives equal or superior results to the aerators now in use. My invention provides a casing for attachment to a water supply system having therein a single perforate member on the upstream or water-entering side having a multiplicity of small passageways through which the water passes after entering the casing. This member is mounted in the casing transverse to the direction of water flow, which is advantageously generally flat, having a peripheral shape to effect close contact with the interior of the casing. My invention is based to a large extent on the arrangement and proportioning of the dimensions of the individual passageways to impart to the water passing therethrough suprising properties. The passageways are so formed as to comprise a chamber, such as a bore hole extending from the downstream or emerging side of the member almost to the upstream side, and an entrance opening on the upstream side of relatively smaller cross-sectional area than the smallest cross-sectional area of the chamber. Each passageway has an entrance opening of restricted area contiguous with a chamber of larger cross-sectional area and having a length in the direction of flow which is greater than its diameter in advantageous embodiments. However, in certain advantageous embodiments it may not be necessary for the length to be greater than the diameter. The flow of water, at a selected pressure and volume of flow, through the passageways in the perforate member, changes the physical state or form of the water entering the chambers causing it to vary from a state of reduced turbulence to such impaired coherence as to have a swollen whitish appearance as it emerges from the member. The side walls of the chamber act as resistance means which plays a part in the change in the character of the water as aforesaid.

The passageways are so constructed and proportioned, in the preferred form of my invention, that water forced therethrough at a selected range of velocity, such as results from the pressure of the usual water supply system, is given such turbulence that the emerging stream or jet is whitish in appearance and swollen when compared with a stream emerging from a bore hole of the same diameter as the chamber. The issuing turbulent stream, because of its velocity and physical structure, has the capacity to carry along a large amount of air.

The improvement in my aerator comprising a casing and the perforate member can be used advantageously in combination with means for adding air into the emerging streams. My invention, accordingly, comprises an aerator casing having my perforate member mounted therein on the upstream side in combination with means for introducing air into the emerging streams. One or more screens or other perforate members, or other resistance or confining means, may be used in the aerator on the downstream side of the perforate member to effect an intermixing of the air with the turbulent streams or jets emerging from the perforate member.

My invention not only reduces the number of parts of the aerator but they can be made in shapes which are easy to construct and assemble. In its use my improved aerator gives improved results mainly due to the impaired coherence of the streamlets, making them amenable to efficient admixing with air and requiring less resistance in their path, giving an output having a higher ratio of air to water.

These and other novel features of the invention will be better understood after considering the following discussion and the accompanying drawings, in which:

FIGURE 1 is a cross-sectional view of an improved aerator constructed in accordance with one form of the present invention.

FIGURE 1A is a partial top view taken on line 1A—1A of the structure shown in FIGURE 1.

FIGURE 1B is a modified form of a structure generally of the type shown in FIGURE 1.

FIGURE 2 illustrates a further improved structure constructed in accordance with the present invention.

FIGURE 2A is a partial top view taken on line 2A—2A of FIGURE 2.

FIGURE 2B is a modified structure generally of the type shown in FIGURE 2.

FIGURE 3 is another form constructed in accordance with the present invention.

FIGURE 4 illustrates still another form constructed in accordance with the present invention.

FIGURE 5 illustrates still another form constructed in accordance with the present invention.

FIGURE 5A is a plan view of the device shown in FIGURE 5.

FIGURE 6 is a cross-sectional illustration of a portion of another form constructed in accordance with the present invention; and FIGURE 6A is a top view of the structure shown in FIGURE 6.

Various structures will be suggested to those skilled in the art operating generally in the manner described. In particular, and referring to FIGURE 1, it will be seen that an improved water aerator constructed in accordance with the present invention may comprise a casing 10 having a water inlet 11 at one end thereof, and further including air inlets 12 and a jet output 13. Disposed within the casing is an improved diaphragm structure 14, constructed in accordance with the present invention; and in particular, this diaphragm structure includes a plurality of elongated substantially tubular chambers 15 therein. The upstream end of the diaphragm 14 has a corrugated configuration; and in particular defines a plurality of walls 16 which are inclined at approximately 45 degrees to the horizontal, with each of the walls 16 intersecting a portion of the upper end of each chamber 15, thereby to form a plurality of restricted openings 17.

Each of the entrance openings is, as illustrated in FIGURE 1, inclined at substantially 45 degrees to the horizontal; but it will be appreciated that this angle is not critical, and is merely selected to give the edges of the orifices a desired thickness. The water forced through the several openings 17 and chambers 15 is given such turbulence that the issuing streamlets have impaired coherence. The height of the chambers 15 will determine to some degree the angle (with respect to the vertical) at which the issuing streamlets emerge. The streamlets may be made to slightly converge, or in the alternative to diverge, if desired, by modifying the height of the chambers. Air entering through inlets 12 may accordingly pass into a main aerator chamber 18; and this air will therefore be carried along by the said issuing streamlets of impaired coherence, which streamlets pass through the aforementioned main chamber 18 onto a screen (or screens) such as 19, and the output is a highly aerated soft bubbly stream of water.

In the particular example shown in FIGURE 1, the structure 14 includes a plurality of webs 20 arranged about a central post 21; and this structure 20—21 cooperates with a pin 22 for holding the screen 19 in place substantially transverse to the direction of fluid flowing through the casing 10. It will be appreciated that the overall structure on the interior of casing 10 may, therefore, be readily removed by merely unscrewing casing 10 from a water tap or the like, and thereafter lifting the interior structure from the said casing.

In actual practice, a structure of the type shown in FIGURE 1 may have the following dimensions: the disc or diaphragm structure 14 may have twenty-nine openings 17, each of which is as shown in FIGURE 1A, equivalent to a round opening having a diameter of approximately 0.75 mm. The several openings 17 communicate with tubular chambers 15, each of which has a diameter of 1 mm., and a maximum height of approximately 3.5 mm. A disc or member, the same in all respects as the one just described, but having holes of a height of only 2.5 mm. gave comparable results. On an average domestic water faucet when the static water pressure was forty-seven pounds, these two discs created back pressures of thirty pounds, and twenty-seven pounds, respectively. When the restricted entrances 17 were omitted, the twenty-nine chambers 15, of 1 mm. diameter each, created a back pressure of twenty pounds. Two wire mesh screens similar to screen 19 may be located approximately 10 mm. downstream of the diaphragm of structure 14, and the said screen may have, for instance, a diameter of 21 mm., and may comprise a screen mesh having forty wires per inch and a wire diameter of 0.009 inch. The discharge opening 13 of casing 10 may have a diameter of 16.5 mm. The structures 14, 20 and 21 may be of metal or may comprise a molded plastic material. If the plastic material employed is sufficiently soft it will directly seal the uppermost portion of the casing 10 to the faucet thereby obviating the necessity of providing a separate washer.

It will be appreciated that the particular body 14 described in reference to FIGURE 1 is unitary in nature. A similar body may, however, take the form of composite or separable parts, thereby facilitating construction in some cases. One such example is shown in FIGURE 1B; and in particular, it will be noted that the body 14 again includes a plurality of elongated tubular chambers 15a, generally of the type already described with reference to chambers 15. A separate corrugated or crimped member 23 may be placed over the uppermost surface of body 14a, as illustrated, and the said member 23 can include a plurality of restricted openings 24 therein, whereby the overall structure shown in FIGURE 1B takes the same general configuration and operates in the same manner already described with reference to the structure shown in FIGURE 1.

Another form, constructed in accordance with the present invention, is shown in FIGURE 2. The structure shown in FIGURES 2 and 2A again takes the form of a casing 30 having a water inlet end 31 and a jet outlet end 32; and the said casing contains therein a cylindrical supporting structure 33 carrying a plurality of screens 34. Slots such as 12 (FIGURE 1) may be dispensed with by this construction, and air is caused to enter along paths adjacent the discharge end of the casing 30, whereby the said air passes intermediate the outer wall of shell 33 and the inner walls of casing 30. An improved aerator similar to that already described in reference to FIGURE 1 is provided; and in particular, this structure comprises a disc or partition-like member 35 having a plurality of legs 36 depending therefrom in spaced relation to one another. The said member 35 further includes a plurality of elongated substantially tubular chambers 37 therein; and air passing upward between shell 33 and the interior surfaces of casing 30 may therefore pass between the several legs 36 and enter adjacent the downstream end of each of chambers 37. Body 35 includes, adjacent its upstream end, a plurality of ring-like projections 38 which partially overlie the upstream end of each of tubular chambers 37. As a result of this configuration, therefore, a plurality of restricted openings 39 are formed adjacent the upstream end of each of chambers 37 whereby, as was the case in the example of FIGURE 1, streamlets of water passing through said openings 39 and chambers 37, discharge with substantial velocity as streamlets having impaired coherence, being of whitish character and carrying along considerable amounts of air, so that when said streamlets strike screen 34, a large volume of air is mixed with the water and the output is a soft highly aerated stream of water.

In actual practice, the body 35 may include three substantially concentric rows of openings 39, and the ring-like projections 38 may be so disposed that they partially close the inlet ends of each tubular chamber 37. The several chambers 37 may have a diameter of approximately 1 mm., the distance D shown in FIGURE 2A may be 0.50 mm. or 0.75 mm. and a height of approximately 3.5 mm., and when these dimensions are chosen member 35 gives results comparable to those of member or diaphragm 14 in FIGURE 1. At a static water pressure of 47 pounds, a disc or member 35, as shown in FIGURE 2, with twenty-nine holes 37 that are of 1 mm. diameter and 3.5 mm. long, created a back pressure of 20 pounds. When projections 38 were added, leaving an entrance opening where distance D (FIGURE 2A) measured 0.5 mm., the back pressure created was 32 pounds; whereas when distance D measured 0.75 mm. the back pressure created was 24 pounds. Both discs or members produced the desired streamlets of impaired coherence like the one specified in connection with FIGURE 1.

Again, as was the case with respect to the structure of FIGURE 1, the device of FIGURE 2 may be made in plural parts rather than being formed as a unitary structure. In particular, as shown in FIGURE 2B, body 35a may be formed with a plurality of elongated chambers 37a extending through the body. A disc member 38a may thereafter be placed over the upstream end of body 35a, and the said member 38a may include a plurality of openings 39a displaced from the elongated axes of the several tubular chambers 37a. As will be seen from an examination of FIGURE 2B, the displaced relation between openings 39a and tubular chambers 37a acts as before to partially close or restrict the uppermost ends of each of the said chambers 37a, whereby the resulting configuration is substantially the same as that already described in reference to FIGURE 2.

Another embodiment of the present invention is shown in FIGURE 3; and in particular, this form of the invention may once more comprise a casing 40 having a water inlet 41 and an air inlet 42, the said casing being adapted to support a disc, partition, or body 43 therein. In this particular embodiment of the invention, the said body 43 again defines a plurality of tubular chambers 44 extending therethrough, and further defines a plurality of ring-like projections 45 disposed to close the middle portions of each upstream end of tubular chambers 44. As a result, water enters the chamber 44 from both sides of each ring-like projection 45, is therein given turbulence and issues in the form of streamlets having impaired coherence, as previously described.

Still another embodiment of the invention is shown in FIGURE 4, and once more, a casing 46 may be provided having a water inlet 47, a jet outlet 48 and air inlets 49 therein. The particular aerator shown in FIGURE 4 further includes a member 50 extending transverse to the direction of fluid flow therethrough. The said member 50 is provided with webs 51. Body 50 is adapted to be inserted into a ring 53, whereby the several webs 51 cooperate with the inner surface of ring 53 to form a plurality of elongated passages or chambers therebetween, with each of the said passages including a restricted entrance opening such as 52 adjacent the upper end thereof and inclined at an angle thereto. To converge or diverge the whitish streamlets so as to better distribute their impact over screen 55, the height of every other chamber could be made bigger than the others, if desired.

The casing 46 further includes one or more screens, such as 55, therein; and body 50 includes an elongated handle 56 depending therefrom and extending through the said screen 55. Webs 56a running along handle 56 serve as guides. As a result of this particular structure, the body 50 may be raised out of the ring 53 by pushing upward on handle 56, whereby the space between body 50 and ring 53 is substantially enlarged, thereby to permit the interior of the aerator to be flushed or cleaned without removing the aerator from a water tap or the like.

Still another form of the present invention is shown in FIGURES 5 and 5A. In particular, these figures illustrate a portion of a disc, partition or diaphragm structure capable of being inserted into an aerator casing in a manner similar to that already described in reference to FIGURES 1 through 4, with the exception that the disposition of chambers and openings differs somewhat from that already described. Member 60 shows two passageways having a tubular shape, and which are representative of many other similar passageways in member 60. Interior projections 61 and 62 are intermediate the inlet and outlet openings. It is understood that member 60 could embody passageways having only the suitable number of projections 61, or in the alternative only projections 62.

FIGURES 6 and 6A illustrate, in partial cross-section, other forms of openings which may be constructed in accordance with the present invention; and these figures are particularly illustrative of structures having plural different types of openings therein. Thus, referring to FIGURE 6, it will be seen that as was the case in FIGURES 1 through 5, an improved structure may take the form of a disc or partition member 70 adapted for insertion into an aerator; and the said member 70 includes a plurality of elongated substantially tubular chambers 71, 72, 73, 74, etc., therein. The member 70 includes portions 75 overlying the uppermost end of chamber 71, whereby a restricted opening 76 is formed which is substantially coaxial with the elongated chamber 71.

Member 70 also includes portions 77 extending over a portion of the uppermost end of chamber 72, thereby to close off a portion of the upper end of chamber 72 in a manner similar to that already described in reference to FIGURE 2. This structure again provides a restricted opening 78 adjacent the uppermost end of chamber 72. Member 70 may further be formed with a ring-like member 79 adjacent the upstream end of chamber 73, thereby to form a pair of restricted openings 80 and 81 communicating with chamber 73.

Finally, member 70 includes a plurality of covers or cap structures 82 disposed over the upstream end of each of chambers 74, with the said cap structures 82 being of a diameter not greater than the diameter of tubular chamber 74. Cap structures 82 are supported in place by a plurality of stems or supporting members 83, disposed between the several orifices. This particular structure obliges water to enter the several chambers 74 from a side or later direction; and in particular, the water must flow under the several covers 82 and thence into the chambers 74, whereby the water is again given turbulence.

While FIGURE 6 shows a disc with four different forms of passageways, it is understood that these four different forms are illustrative. While all four different forms could be used on one disc as shown, it is understood that a disc of twenty-nine (more or less) holes could be made with any one of the four forms of passageways or with any combination of such forms of passageways.

While I have thus described preferred embodiments of the present invention, it must be stressed that the foregoing description is meant to be illustrative and is not limitative of my invention. Various modifications and variations will be suggested to those skilled in the art; and all such modifications and variations as are in accord with the principles described are meant to fall within the scope of the appended claims.

I claim to have invented:

1. A device for producing a plurality of jets of aerated water comprising a casing the inlet end of which is adapted for connection with the discharge end of a tube containing water under pressure and the outlet end of which is adapted to discharge the water, partition means across the inside of the casing for converting the water into a plurality of jets and having for each said jet a water entrance in the form of at least one entrance opening which imparts turbulence to the water, the downstream side of said partition means being in communication with air outside the casing, and resistance means, for each of said plurality of jets, in the form of a chamber the upstream end of which is in operative communication with its complementary water entrance, the resistance offered by said chambers and the cross-sectional area of the entrance openings being proportioned to largely fill each chamber with turbulent water in the form of a coalesced and coherent stream and which discharges as a whitish jet of impaired coherence that entrains a substantial quantity of air, each entrance opening to a chamber being restricted to an effective size which is on the order of half the smallest cross-section of the chamber.

2. A device as defined in claim 1 in which the chambers in the partition means have a transverse dimension on the order of one millimeter and in which the chambers have a length on the order of 2.5 millimeters.

3. A device for producing a jet of water which has the capacity to carry along with it a large amount of air comprising a conduit adapted to be connected at one end to a source of water under pressure, partition means across the conduit, the downstream side of said partition means being exposed to air, said partition means defining a chamber extending upstreamwardly from the downstream side of the partition means to thereby form a discharge opening for discharging the jet, said partition means defining at least one water entrance opening leading from the upstream side of the partition means into the said chamber and imparting turbulence to the water, the ratio of the cross-section of said entrance opening to the cross-section of said chamber, for a given height of said chamber, being such that water discharged from the discharge opening of the chamber forms a jet of impaired coherence which is whitish in appearance and swollen.

4. In a device for producing a plurality of jets of water that have the capacity to carry with them a large quantity of air, a water conduit adapted to be connected at its upstream end to a source of water under pressure, partition means extending across the casing for producing said plurality of jets, the downstream side of said partition means being exposed to air, said partition means having therein a plurality of chambers which extend upstreamwardly from the downstream side of the partition means, the downstream ends of the chambers being open and forming discharge openings for discharging said jets, said partition means including, for each chamber, turbulence producing means and also including at least one water entrance passageway for feeding water from the upstream side of the partition means into the chamber and producing turbulence of the water in the chamber, the ratio of the cross-section of the entrance passageway of each chamber to the cross-section of the chamber being so proportioned with respect to the height of the chamber that the wall of the chamber forms means for causing water passage through said passageway into said chamber, to form, upon emergence from the discharge opening of the chamber, a whitish swollen jet of impaired coherence 5. In a device for producing a multiplicity of jets of water, a casing adapted to be connected at its upstream end to a source of water under pressure, partition means across the casing for delivering said multiplicity of jets, the downstream side of said partition means being exposed to air, said partition means having a multiplicity of chambers positioned one adjacent to the next in the partition means, each said chamber extending upstreamwardly from the downstream side of the partition means and forming a discharge opening at the downstream end of each chamber, said partition means including for each said chamber at least one turbulence producing water entrance passageway leading into the chamber from the upstream side of the partition means and which is restricted in cross-section with reference to the corss-section of the chamber and directs water into the chamber to produce turbulence therein, the ratio of the cross-section of the entrance passageway of a chamber to the cross-section of the chamber being so proportioned with respect to the height of the chamber that the partition means includes means which changes the physical form of the water entering the chamber into a whitish jet of impaired coherence and swollen when compared to a stream from a hole of the same cross-section as the chamber.

6. A device for producing a jet of water as defined in claim 3 in which the chamber extends through the partition means, said partition means including covering means located above the chamber to form the entrance opening.

7. A device for producing a jet of water as defined in claim 3 in which the entrance opening directs the water into the chamber at an angle to the axis of the chamber.

8. A device for producing a jet of water as defined in claim 3 in which the upper edge of the chamber wall is at least in part contiguous with the entrance opening.

9. A device for producing a jet of water as defined in claim 3 in which the partition means includes covering means that overlies at least a part of the top of the chamber thereby requiring at least a part of the water entering the chamber to change its direction as it enters the chamber.

10. A device for producing a jet of water as defined in claim 3 in which there is located in the path of the water leaving the chamber, mixing means which mixes said water with air and discharges the resultant stream as a coherent jet laden with numerous small bubbles.

11. A device for producing a coherent jet of water laden with numerous small bubbles as defined in claim 10 in which said partition means is a one-piece molded plastic element.

12. A device as defined in claim 4 having in addition screen means for coalescing said plurality of jets and producing a coherent stream of water laden with numerous small bubbles.

13. A device for producing a jet of water comprising a casing adapted to be connected at its upstream end to a source of water under pressure, partition means across the casing and having a chamber therein extending from the downstream side thereof to the upstream side thereof, said partition means including covering means partially covering the upstream end of the chamber leaving at least two openings into the chamber between said covering means and at least two portions of the upper edge of the wall of the chamber so that water enters the chamber at its upper edge and initially flows toward the axis of the chamber for subsequent discharge from the downstream end of the chamber, the downstream side of the partition means being exposed to air, screen means having resistance to the flow of water located in the path of the water discharged from the chamber, the ratio of the cross-section of said openings into the chamber to the cross-section of the chamber being proportioned to the length of the chamber and the resistance of the screens such that the water discharged by the screen means is a coherent jet laden with numerous small bubbles.

14. A device for producing a jet of water as defined in claim 13 in which the partition means including the covering means is a one-piece plastic element.

15. A device as defined in claim 4 having in addition screen means in the path of said jets for coalescing the jets and producing a coherent jet of water laden with numerous small bubbles.

16. A device as defined in claim 4 in which the turbulence producing means comprises covering means spaced above the upper end of the chamber for allowing water to enter around the covering means into the chamber contiguous with at least a portion of the upper edge thereof.

17. A device as defined in claim 5 having in addition screen means for coalescing said plurality of jets and producing a coherent stream of water laden with numerous small bubbles.

18. A device as defined in claim 17 in which said covering means partially covers the upstream end of the chamber leaving at least two water inlet passageways each extending from the upper outer edge of the chamber to the covering means to thus produce more aeration in said coherent stream than would be the case in the absence of the covering means.

19. A device as defined in claim 5 in which the turbulence producing water entrance passageway of a chamber enters the chamber contiguous with the upper edge thereof and causes the water to enter the chamber transverse to the axis of the chamber.

20. A device as defined in claim 5 having in addition screen means in the casing for coalescing said multiplicity of jets in the presence of air and producing a coherent jet of water laden with numerous small bubbles.

21. A device for producing a jet of water comprising a casing adapted to be connected at its upstream end to a source of water under pressure, partition means across the casing and having a chamber therein extending upstream wardly from the downstream side thereof, said partition means including means defining a water entrance comprising at least one orifice to said chamber communicating with a side wall of said chamber adjacent the upstream end of the chamber, whereby water entering the chamber through said entrance opening is diverted in direction before subsequent discharge from the downstream end of the chamber, the downstream side of the partition means being exposed to air, and screen means having resistance to the flow of water located in the path of the water discharged from the chamber for producing a coherent stream laden with numerous small bubbles, the relative sizes of the entrance opening and the chamber being such that the device will produce the coherent stream laden with numerous small bubbles.

22. A device for producing a jet of water as defined in claim 21 in which the cross-section of the water entrance is less than the cross-section of the chamber, and the cross-section of the chamber is less than two times the cross-section of the water entrance.

23. In a device for producing a coherent jet of water containing air bubbles, comprising a main mixing chamber, the inlet end of which is adapted for connection with the discharge end of a tube containing water under pressure and the outlet end of which is adapted to discharge the said coherent jet, a diaphragm at the upstream end of the main mixing chamber having at least one discharge chamber terminating in an outlet orifice through which the stream of water is adapted to be forced into the main mixing chamber with substantial velocity, an air port opening into the main mixing chamber through which air is induced by the stream of water, means, in the path of the stream of water after it leaves said orifice and before it discharges at the outlet end, for finely breaking up the water and for offering sufficient resistance for thoroughly mixing it with air and for thereafter uniting the aerated water to form a coherent jet having small bubbles disseminated throughout the jet, the improvement comprising a passageway at the upstream end of said discharge chamber forming at least one restricted entrance opening for admitting water into said discharge chamber, the ratio of the cross-section of said passageway to the cross-section of said discharge chamber being proportioned to the length of the discharge chamber such that the water entering the passageway is transformed to a jet which upon its discharge from said orifice is whitish, swollen, has impaired coherence and carries with it large quantities of air.

References Cited in the file of this patent

UNITED STATES PATENTS

| | | |
|---|---|---|
| 1,110,453 | Monosmith | Sept. 15, 1914 |
| 1,912,113 | Aghnides | May 30, 1933 |
| 2,210,846 | Aghnides | Aug. 6, 1940 |
| 2,316,135 | Turek et al. | Apr. 6, 1943 |
| 2,388,508 | Timpson | Nov. 6, 1945 |
| 2,435,449 | Kubacki et al. | Feb. 3, 1948 |
| 2,463,975 | Johnson | Mar. 8, 1949 |
| 2,564,060 | Gettins | Aug. 14, 1951 |
| 2,633,343 | Aghnides | Mar. 31, 1953 |
| 2,643,104 | Holden | June 23, 1953 |
| 2,707,624 | Shames et al. | May 3, 1955 |
| 2,738,798 | Goodrie | Mar. 20, 1956 |